United States Patent [19]

Hobrough

[11] Patent Number: 4,628,210
[45] Date of Patent: Dec. 9, 1986

[54] BINOCULAR ARTIFICIAL VISION SYSTEM WITH VARIABLE EYEBASE IN RESPONSE TO A QUALITY OF CORRELATION SIGNAL

[76] Inventor: Gilbert L. Hobrough, Westbury, 5 Station Road, Bentley, Farnham, Hampshire, England

[21] Appl. No.: 542,188

[22] Filed: Oct. 14, 1983

[30] Foreign Application Priority Data

Oct. 28, 1982 [GB] United Kingdom ............... 8230799

[51] Int. Cl.⁴ ............................................. G01C 11/12
[52] U.S. Cl. ....................................... 250/558; 356/2
[58] Field of Search ............... 250/558; 356/2; 358/88

[56] References Cited

U.S. PATENT DOCUMENTS 3,554,645  1/1971  Bertram .............................. 250/558
3,726,591  4/1973  Heleva et al. ........................ 356/2
3,752,580  8/1973  Hardy .................................. 250/558
3,783,294  1/1974  Koper .................................. 250/558

*Primary Examiner*—David C. Nelms
*Assistant Examiner*—James G. Gatto
*Attorney, Agent, or Firm*—Hughes & Cassidy

[57] ABSTRACT

Disclosed herein is a binocular artificial vision system including left and right hand video cameras providing left and right video signals to a stereo correlator providing a correlated distance signal at the output thereof. The left and right hand video cameras have overlapping fields-of-view, the stereo correlator derives a quality of correlation signal as well as a range distance signal from the left and right video signals, and means are provided to vary the effective eyebase of the video cameras in response to the quality of correlation signal.

5 Claims, 3 Drawing Figures

BINOCULAR ARTIFICIAL VISION SYSTEM WITH VARIABLE EYEBASE IN RESPONSE TO A QUALITY OF CORRELATION SIGNAL

TECHNICAL FIELD OF THE INVENTION

The present invention relates to a binocular artificial vision system, incorporating two synchronised image sensors and stereo image-data correlation, for establishing relative or absolute spatial co-ordinates in three dimensions of visible objects. In particular it deals with the geometry of the sensing system and the relationship of this geometry to a problem encountered when dealing with non-contiguous objects under "real-time" conditions.

BACKGROUND OF THE INVENTION

Binocular artificial vision is an extension of a photogrammetric stereo image-correlation technique that has been developed as a rapid means of extracting three-dimensional topographic information from aerial photographs (See for example U.S. Pat. No. 3,659,939). In aerial surveying the object to be defined, usually the surface of the ground as seen from considerable altitude, can usually be regarded as a single convoluted or undulated surface. The general continuity of the resultant model surface simplifies "correlative matching" since successful correlation of any small part of the model leads to a rapid spread of correlation and matching over the entire area under examination.

Such a system is shown in FIG. 1 which illustrates schematically the elements of a binocular stereo correlation system suitable for photogrammetric purposes.

Referring to FIG. 1, a pair of transparent "diapositive" aerial photographs 1 and 2 (left and right respectively) are illuminated by light sources 3 and 4 respectively and viewed by left and right video cameras 5 and 6 respectively. The cameras generate left and right video signals on lines 7 and 8 respectively which are delivered to the stereo correlator 9. Topographic height data is computed within the correlator and delivered via line 10 to external storage or display means.

The application of such photogrammetric stereo image-correlation techniques to an artificial vision system dealing with three-dimensional workspace environments is severely limited by the discontinuous nature of a workspace containing both close and distant objects separated from each other and from the background by significant distances. As the stereo images from such a scene are scanned and processed, abrupt changes in distance will occur whenever the correlator encounters an object edge. Such discontinuities prevent the spread of correlation so that some means must be found to initiate the correlative matching process within each area bounded by spatial discontinuities including the edges of the field of view.

DEFINITIONS

"Workspace" is defined herein as being all light reflecting surfaces visible in the video camera's field-of-view including background (e.g. walls, floors, ceilings etc.), and foreground and intermediate objects, of any kind;

"Object" is defined herein as being any part or content of the workspace separated from the background, whether moveable or not;

"Video camera" is defined herein as being any image sensing device that employs an optical system (such as a lens) to project an image of an object on a photo-reactive surface and produce an electrical signal descriptive of the object, and includes a television camera;

"Image" is defined herein as being the optical system's projection of the workspace, including any objects present therein, on the photo-reactive surface of a video camera, "Eyebase" is defined herein as being the spatial separation of a pair of video cameras, "Model" is defined herein as being the three dimensional representation of the workspace and the contents thereof built up by a correlator and stored in the gestalt memory of the correlator.

OBJECT OF THE INVENTION

It is an object of the present invention to provide a means to accommodate for the effect of discontinuities in a binocular artificial vision system.

SUMMARY OF THE INVENTION

According to the present invention, a binocular artificial vision system includes left and right hand video cameras having overlapping fields-of-view and providing corresponding left and right video signals to a stereo correlator that derives a range distance signal and a quality of correlation signal therefrom, means being provided to vary the effective eyebase of the video cameras in response to the quality of correlation signal. The eyebase might actually be varied by physically moving the video cameras with respect to one another or by employing an optical system to alter the relative fields of view of the cameras.

A suitable correlator is described in our co-pending United Kingdom Patent Application No. 8227609, wherein the correlator described with reference to FIG. 12 produces a range distance signal $\Delta X$ from multiplier 132 and a quality of correlation signal from inverter 131.

The invention is illustrated, by way of example, in the drawings, wherein:

Figure 2:
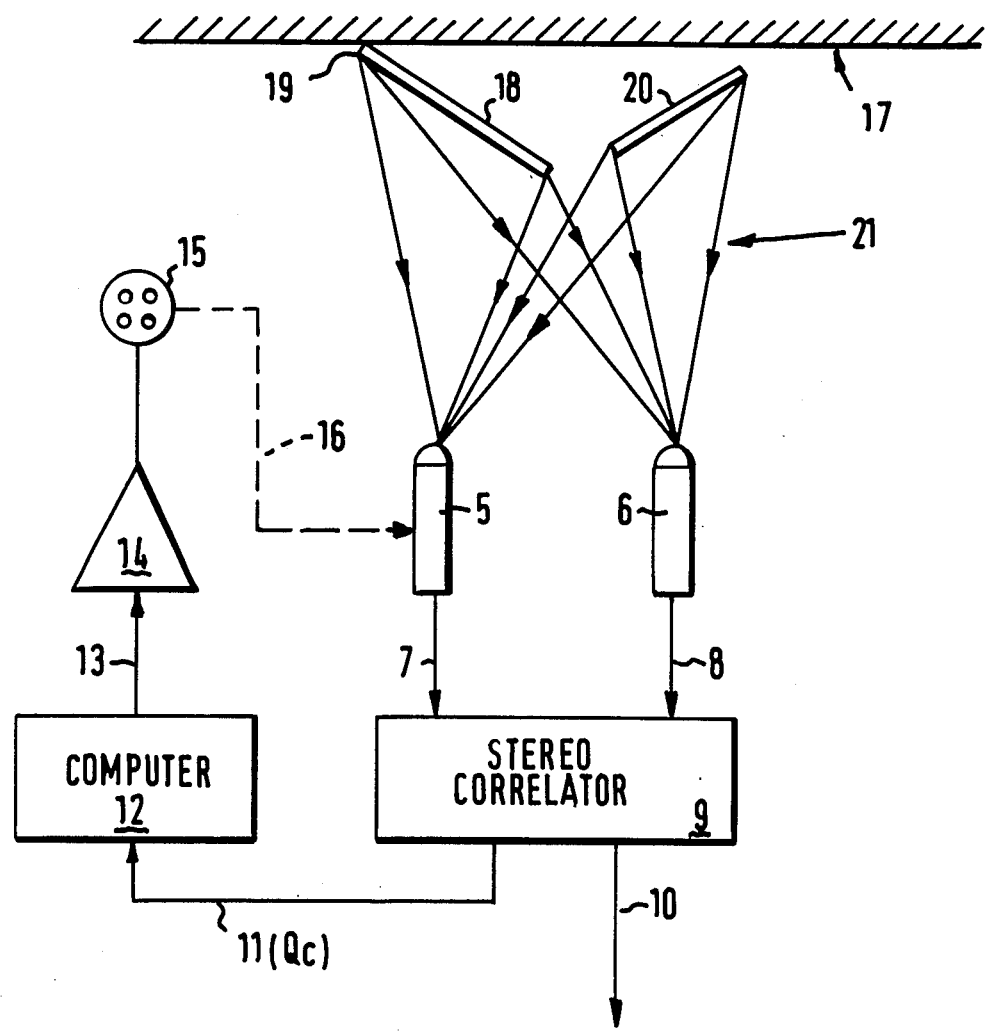
FIG. 2 is a schematic showing the elements of a binocular artificial vision system in accordance with the present invention and including a facility to vary the eyebase, viewing several objects at close range.

As shown by FIG. 2, left and right video cameras 5 and 6 respectively are trained upon objects 18 and 20 seen against a background 17 and contained within the workspace. The cameras provide left and right video signals on lines 7 and 8 respectively. These signals are processed by a stereo correlator 9 to provide object to camera range distance data on line 10 and a "quality of correlation" signal (Qc) on line 11. A computer 12 in response to the Qc signal generates an "eyebase control" signal on line 13 which activates motor control 14 causing motor 15 to vary the eyebase by moving camera 5 through a linkage indicated schematically by the broken line 16. The eyebase may alternatively be varied by other mechanical means or by optical means. Instead of actually or effectively moving a camera with respect to the other, both cameras might be moved to preserve a centre-point for the eyebase.

The quality of correlation signal (Qc) is the result of a simple correlation of the video signals on lines 7 and 8.

The computer 12 is programmed so that the eyebase is subject to two modes of control:

In mode (1), on first commencement of operation the eyebase is set to its minimum value to ensure correlation over the apparently flat appearance of the object. The eyebase is then increased at a controlled rate until a normal value for the camera to object distance is reached.

In mode (2), if, during subsequent operation, correlation is lost over a significant area, the action in accordance with mode (1) is repeated to re-establish correlation. If correlation is not re-established reasons other than area edge breaks must be responsible for the loss of correlation.

Clearly, mode (2) will provide for mode (1) automatically.

Cameras 5 and 6 are shown, in plan view, viewing a scene containing a first object represented by a background wall 17, an inclined surface 18 one side of which contacts the wall at 19, and a second object represented by an inclined surface 20 completely separated from the back wall. A series of lines 21 are shown representing light rays from the sides of surfaces 18 and 20 to each of the two cameras 5 and 6. FIGS. 3a to 3d illustrate the output signal on line 10 during one horizontal scan of the field of view; the apparent distances from the cameras to the objects is represented by the level (26) of the output signal, with the closer distances being represented by an increased ordinate.

Figure 1:
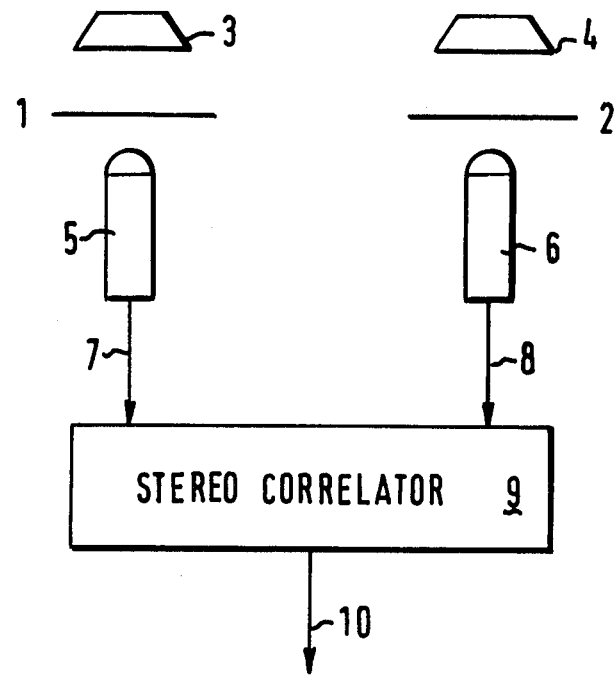
FIG. 1 is a schematic representation of the prior art binocular artificial vision system discussed above.
Figure 3:
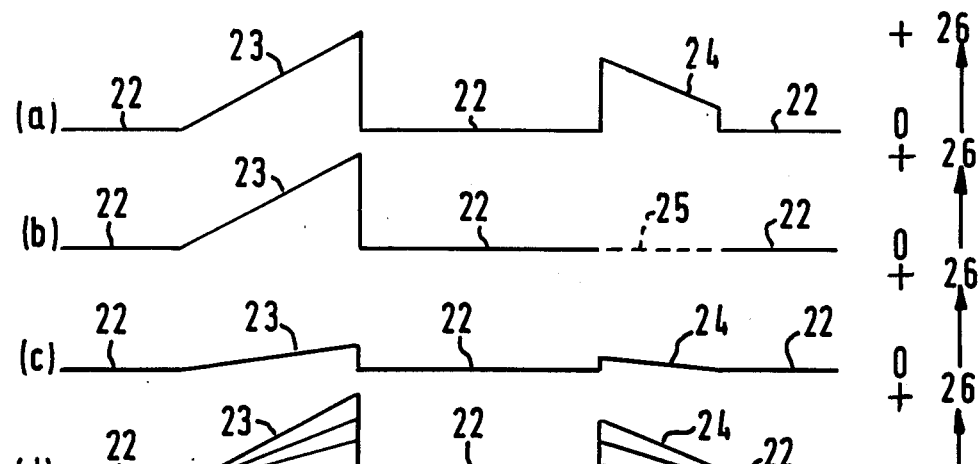
FIG. 3 illustrates the output waveforms, under several eyebase conditions, from the system shown in FIG. 2.

In FIG. 3 at (a), the signal is shown under conditions of perfect correlation at maximum eyebase (i.e. maximum separation of the cameras). The signal representing the back wall appears at 22. The signals representing objects 18 and 20 appear at 23 and 24 respectively.

In FIG. 3 at (b) the output signal is shown for the same scene but on the assumption that correlation has just stabilised after turn-on, and that the eyebase has remained fixed at the maximum separation. It will be seen that the background 17 and the object 18 are represented at 22 and 23 as in FIG. 3a, but that object 20 is not seen. This situation would occur if the correlative matching process started at some point on the wall 17 or on object 18. Correlative matching would spread from that point until matching had been established for all contiguous surfaces and any non-contiguous surfaces separated by apparent distances within the pull-in range of the correlator. Object 20 is separated from the background wall by an apparent distance greater than the pull-in range of the correlator 9 which would therefore not "see" object 20, but would fill in the gap in the signal waveform by a linear interpolation process to give the signal represented by the broken line 25.

FIG. 3, at (c), shows the output signal as if correlation has stabilised after turn-on with the eyebase fixed at a greatly reduced separation. All apparent-distance differences are reduced. In particular the apparent distance 26 of object 20 from the background 17 is now within the pull-in range of the correlator so that all objects are now shown but in reduced relief.

FIG. 3, at d, shows the effect of increasing the eyebase from that which produced the signal shown in FIG. 3 at (c). Providing that the rate of eyebase increase is suitable the apparent relief will increase until the condition resulting in the signal shown in FIG. 3 at (a) is obtained. If the rate of eyebase increase is too rapid then successive scans may sense that the apparent distance 26 is greater than the pull-in range of the correlator, resulting once again in the condition causing the signal shown in FIG. 3 at (b).

I claim:
1. A binocular artificial vision system including:
   (i) left and right video cameras so arranged on an eyebase as to have overlapping fields-of-view of a workspace including a background and at least one object separated from said background, said video cameras respectively producing left and right video signals;
   (ii) means mounting said cameras for relative physical movement to vary said eyebase;
   (iii) stereo correlator means so connected to said left and right video cameras as to receive said left and right video signals and to provide as an output a correlated range distance signal and a quality of correlation signal; and
   (iv) means so connected to said camera mounting means and to said stereo correlator means as to receive said quality of correlation signal and vary said camera eyebase in response to the value of said quality of correlation signal.

2. A system as claimed in claim 1, wherein said means for varying the camera's eyebase acts to move one camera with respect to the other to thereby vary the spatial separation of the two cameras.

3. A system as claimed in claim 1, wherein said means for varying the camera's eyebase acts to move both cameras relative to one another to thereby vary the spatial separation of the two cameras.

4. A system as claimed in claim 1, wherein said means for varying the camera's eyebase consists of:
   (i) computer means so connected to said stereo correlator means as to receive said quality of correlation signal and, in response thereto, provide as an output an eyebase control signal;
   (ii) means comprising a motor connected by mechanical linkage means to one of the cameras for moving said camera relative to the other camera; and
   (iii) motor control means so connected to said computer means and to said motor as to receive said eyebase control signal and provide as an output a motor control signal.

5. A binocular artificial vision system including:
   (i) left and right video cameras so arranged on an eyebase as to acquire overlapping fields-of-view of a workspace including a background and at least one object separated from said background, said video cameras respectively producing left and right video signals;
   (ii) stereo correlator means so connected to said left and right video cameras to receive said left and right video signals and to provide as an output a correlated range distance signal and a quality of correlation signal; and
   (iii) means connected to said stereo correlator means to receive said quality of correlation signal and to vary said camera eyebase in response to the value of said quality of correlation signal by optically altering the relative fields of view of said left and right cameras without movement of said cameras or of said workspace or features thereof relative to said camera to thereby vary the effective spatial separation.

* * * * *